United States Patent
Zhao et al.

(10) Patent No.: US 10,163,146 B2
(45) Date of Patent: Dec. 25, 2018

(54) METHOD AND SYSTEM FOR DISPLAYING LOCATION BASED DINING RECOMMENDATION LABELS IN A REDUCED IMAGE AREA OF AN INTERFACE

(71) Applicant: Alibaba Group Holding Limited, George Town, Grand Cayman (KY)

(72) Inventors: Linna Zhao, Hangzhou (CN); Peixiang Zheng, Beijing (CN); Sihui Che, Hangzhou (CN); Sen Yu, Hangzhou (CN); Yuan Fang, Hangzhou (CN)

(73) Assignee: KOUBEI HOLDING LIMITED, George Town (KY)

( * ) Notice: Subject to any disclaimer, the term of this patent is extended or adjusted under 35 U.S.C. 154(b) by 486 days.

(21) Appl. No.: 14/739,965

(22) Filed: Jun. 15, 2015

(65) Prior Publication Data

US 2016/0071185 A1    Mar. 10, 2016

(30) Foreign Application Priority Data

Sep. 4, 2014   (CN) .......................... 2014 1 0449194

(51) Int. Cl.
G06Q 30/00    (2012.01)
G06Q 30/06    (2012.01)
G06Q 50/12    (2012.01)

(52) U.S. Cl.
CPC ......... *G06Q 30/0631* (2013.01); *G06Q 50/12* (2013.01)

(58) Field of Classification Search
CPC ............................ G06Q 30/00; G06Q 50/12
See application file for complete search history.

(56) References Cited

U.S. PATENT DOCUMENTS

2008/0065649 A1   3/2008  Smiler
2009/0144264 A1   6/2009  Singh et al.
(Continued)

FOREIGN PATENT DOCUMENTS

JP    2012216139 A    11/2012
WO    2014064863 A     1/2014

OTHER PUBLICATIONS

Patrick Baudisch, Xing Xie, Chong Wang, and Wei-Ying Ma. 2004. Collapse-to-zoom: viewing web pages on small screen devices by interactively removing irrelevant content. InProceedings of the 17th annual ACM symposium on User interface software and technology;(UIST '04). ACM, New York, NY, USA, 91-94.&nbs.*

*Primary Examiner* — Resha Desai
*Assistant Examiner* — Michelle T Kringen
(74) *Attorney, Agent, or Firm* — Shun Yao; Park, Vaughan, Fleming & Dowler LLP

(57) ABSTRACT

One embodiment provides a system that facilitates efficient use of a dining application by providing dining recommendations to a user. During operation, a server determines a plurality of labels associated with a plurality of users, where a label indicates dining preference information of a user, and where the dining preference information is based on historical information for the user. The server receives a request from a first user to determine dining preference information of nearby users. The server determines a location for the first user, identifies one or more second users located within a predetermined distance from the first user, and aggregates the labels associated with the second users. Subsequently, the server returns the aggregated labels to the first user.

22 Claims, 10 Drawing Sheets

(56) References Cited

U.S. PATENT DOCUMENTS

2010/0141602 A1*  6/2010  Duchene .............. G05B 19/042
                                                      345/173
2011/0173130 A1   7/2011  Schaefer, IV et al.
2011/0208617 A1*  8/2011  Weiland ................ G06Q 30/00
                                                      705/27.1
2015/0007099 A1*  1/2015  Bernaudin ............ G06F 3/0484
                                                      715/783

* cited by examiner

TABLE 150

| USER ID 180 | TAG 1 151 | TAG 2 152 | TAG 3 153 | TAG 4 154 | TAG 5 155 | TAG 6 156 |
|---|---|---|---|---|---|---|
| USER A | Coffee | Sirloin steak | Mizong crab | ... | .... | ... |
| USER B | Korean cuisine | Bean curd with odor | ... | ... | ... | ... |
| ... | ... | ... | ... | ... | ... | ... |

FIG. 1D

TABLE 160

| USER ID 180 | TAG 1 151 | SCORE 1 161 | TAG 2 152 | SCORE 2 162 | TAG 3 153 | SCORE 3 163 |
|---|---|---|---|---|---|---|
| USER A | Coffee | S1 | Sirloin steak | S2 | Mizong crab | S3 |
| USER B | Korean cuisine | S4 | Bean curd with odor | S5 | | |
| ... | ... | ... | ... | ... | ... | ... |

FIG. 1E

TABLE 170

| USER ID 180 | TAG 1 151 | SCORE 1 161 | TIME RANGE 1 171 | TAG 2 152 | SCORE 2 162 | TIME RANGE 2 172 |
|---|---|---|---|---|---|---|
| USER A | Coffee | S1 | 14:00-16:00 | Sirloin steak | S2 | 17:30-19:30 |
| USER B | Korean cuisine | S4 | 14:00-16:00 | Bean curd with odor | S5 | 17:30-19:30 |
| ... | ... | ... | ... | ... | ... | ... |

FIG. 1F

METHOD AND SYSTEM FOR DISPLAYING LOCATION BASED DINING RECOMMENDATION LABELS IN A REDUCED IMAGE AREA OF AN INTERFACE

RELATED APPLICATION

Under 35 U.S.C. 119, this application claims the benefit and right of priority of Chinese Patent Application No. 201410449194.3, filed 4 Sep. 2014.

BACKGROUND

Field

The present application relates to the field of information processing technology and, particularly, to a method and system for providing user information in a dining application.

Related Art

The progress of e-commerce technology brings an increasing amount of online involvement into various aspects of everyday life. E-commerce can involve transactions related to physical goods (such as purchasing clothing or electronic equipment online) or services. An example of a service-related e-commerce transaction is for a dining service, where a user (e.g., a buyer) can use an e-commerce application (e.g., a dining application) to browse available food items from various dining venues, order and pay for food items from a specific dining venue, and receive an electronic receipt. The user can go to the dining venue and present his receipt to obtain his ordered and paid-for items. The user can also have the items delivered to an address and present his receipt upon delivery. In addition, the store (e.g., the seller) can confirm fulfillment of the order upon the buyer having received the paid-for food items (e.g., upon delivery by the seller or pickup by the buyer).

While such a dining application can provide convenience to the user (e.g., by allowing him to order meals from any location, including his home, work, or on-the-go from a mobile device), some issues remain in its practical application. For example, a user may have difficulty deciding which food items to order from which dining venues, which may result in the user browsing through multiple food items from multiple dining venues. This may be a time-consuming process that is inefficient for both the user and seller.

SUMMARY

One embodiment provides a system that facilitates efficient use of a dining application by providing dining recommendations to a user. During operation, a server determines a plurality of labels associated with a plurality of users, where a label indicates dining preference information of a user, and where the dining preference information is based on historical information for the user. The server receives a request from a first user to determine dining preference information of nearby users. The server determines a location for the first user, identifies one or more second users located within a predetermined distance from the first user, and aggregates the labels associated with the second users. Subsequently, the server returns the aggregated labels to the first user.

In a variation of this embodiment, determining the plurality of labels involves: determining labels for a food item or a dining venue; obtaining historical information for the plurality of users; extracting information associated with a food item or a dining venue from the historical information; and aggregating the extracted information to determine one or more labels for a respective user.

In a further variation, determining labels for a food item or a dining venue involves one or more steps of: in response to determining that a name for the food item is associated with a predetermined list of names, setting the label for the food item to the name; in response to determining that a category for the food item is associated with a predetermined list of categories, setting the label for the food item to the category; in response to determining that a name for the food item includes a word that corresponds to a predetermined keyword label, setting the label for the food item to the predetermined keyword label; and in response to determining that a description for the food item matches a condition that corresponds to a predetermined mapped label, setting the label for the food item to the predetermined mapped label.

In a further variation, the historical information includes one or more of: a transaction performed by a user; a browsing function performed by the user; a search function performed by the user; and a picture-sharing function performed by the user.

In a further variation, aggregating the extracted information involves: determining a number of occurrences in which a label is associated with an operation included in the historical information; calculating a score for a respective label based on the determined number of occurrences and a predetermined weight for the corresponding operation; and determining the labels for the respective user based on the calculated score.

In a variation of this embodiment, determining the plurality of labels associated with the plurality of users involves: indicating a time range for a respective label based on a number of occurrences in which the label is associated with an operation included in the historical information. In addition, aggregating the labels associated with the second users involves: determining a target time range based on a current time; and aggregating labels which are associated with the target time range and the second users.

In a further variation, the server receives from the first user a request for information associated with a label selected by the first user. The server determines a dining venue associated with food items which are associated with the selected label, where the dining venue is located within a predetermined distance from the first user. The server returns information associated with the determined dining venue and the associated food items to the first user.

In another embodiment, a client computing device sends to a server a request for determining dining preference information of nearby users, where the client computing device is associated with a first user. In response to the request, the client computing device receives one or more aggregated labels associated with one or more second users located within a predetermined distance from the first user. The client computing device displays the aggregated labels in a user interface of the client computing device.

In a further variation on this embodiment, the client computing device allows the first user to select one of the displayed labels and sends a command to the server based on the selected label. In response to the command, the client computing device receives information corresponding to the selected label and associated with a target dining venue located within a predetermined distance from the first user. The client computing device displays the received information in the user interface, where the received information indicates the target dining venue and associated food items.

In a further variation, the command indicates: an order by the first user for a food item from a dining venue selected by the first user; or a browsing operation for information relating to a food item from a dining venue selected by the first user.

In a further variation, the displayed labels are displayed in a first display area of the user interface, and the received information indicating the target dining venue and the associated food items is displayed in a second display area of the user interface. In response to the first display area being moved out of a visible range of a display of the client computing device, the client computing device reduces a size of the first display area, and displays the displayed labels in a fixed and predetermined position within the visible range of the display of the client computing device.

BRIEF DESCRIPTION OF THE FIGURES

FIG. 1D illustrates an exemplary table depicting how labels for users can be stored in a database structure, in accordance with an embodiment of the present application.

FIG. 1E illustrates an exemplary table depicting how labels for users can be stored in a database structure, including a score for each label, in accordance with an embodiment of the present application.

FIG. 1F illustrates an exemplary table depicting how labels for users can be stored in a database structure, including a score and a time range for each label, in accordance with an embodiment of the present application.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention solve the problem of improving the efficiency of a dining application by allowing a user to browse, select, and order food items based on previously gathered dining preferences of other users that are located geographically close to the user's current location. Based on these previously gathered dining preferences, the system provides efficient and effective guidance to the user regarding what has been consumed by other people in the surrounding area, thus allowing the user to efficiently browse, select, and order food items from various dining venues.

Figure 1A:
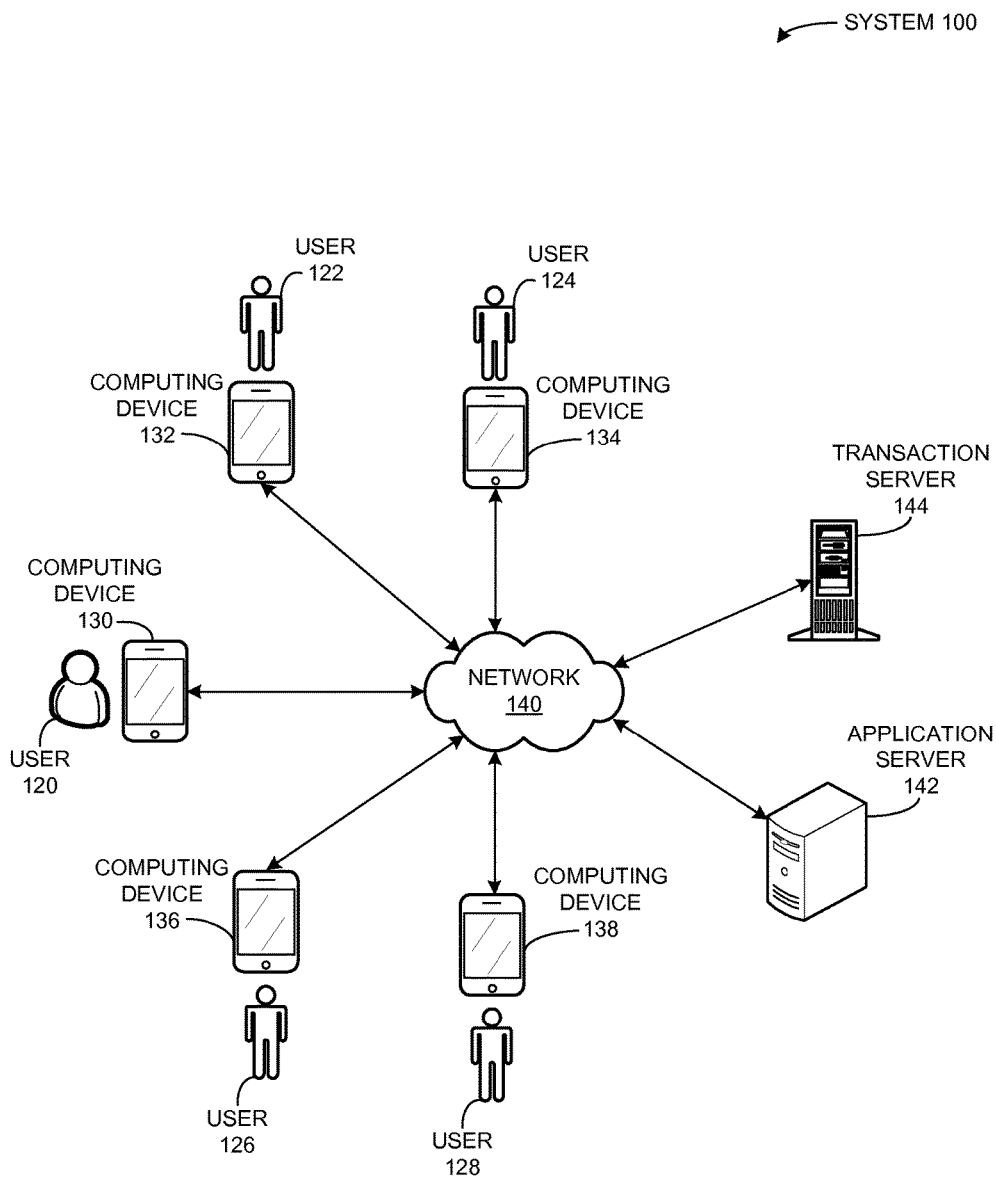
FIG. 1A illustrates an exemplary computing system that facilitates efficient use of a dining application, in accordance with an embodiment of the present application.

FIG. 1A illustrates an exemplary computing system 100 that facilitates efficient use of a dining application, in accordance with an embodiment of the present application. In this example, system 100 can include computing devices 130, 132, 134, 136, and 138, which are associated with users 120, 122, 124, 126, and 128, respectively. Computing devices 130-138 can include, for example, a desktop computer, a tablet, a mobile phone, a laptop, a home media center, or any other computing device. Computing devices 130-138 can communicate with an application server 142 and a transaction server 144 (e.g., an electronic commerce merchant's datacenter) via a network 140.

During operation, server 142 first determines dining preferences of users (e.g., users 120-128). Server 142 can use historical and activity information of a user (e.g., operations performed by a user) to determine the dining preference information. For example, server 142 can use a label to indicate a food item from a specific dining venue, and assign one or more labels based on the food items and dining venues from which the user has ordered before. In addition, a user (for example, user 120) can send a request to server 142 to determine dining preference information for surrounding users (e.g., users that are geographically close to user 120). Upon receiving this request, server 142 determines a location for user 120. Server 142 also identifies one or more surrounding users that are currently located within a predetermined distance from user 120's current location (e.g., within 1 kilometer). The identified surrounding users can include users 122 and 124. Server 142 aggregates the labels associated with the identified surrounding users (e.g., users 122 and 124) and returns the aggregated labels to user 120. The aggregated labels are then displayed in a user interface (e.g., on a screen) of computing device 130 for user 120. In this manner, system 100 presents the dining preference information of surrounding users as labels in a user interface for user 120, thus allowing user 120 to efficiently browse, select, and order food items from geographically close dining venues.

Application Server

Figure 1B:
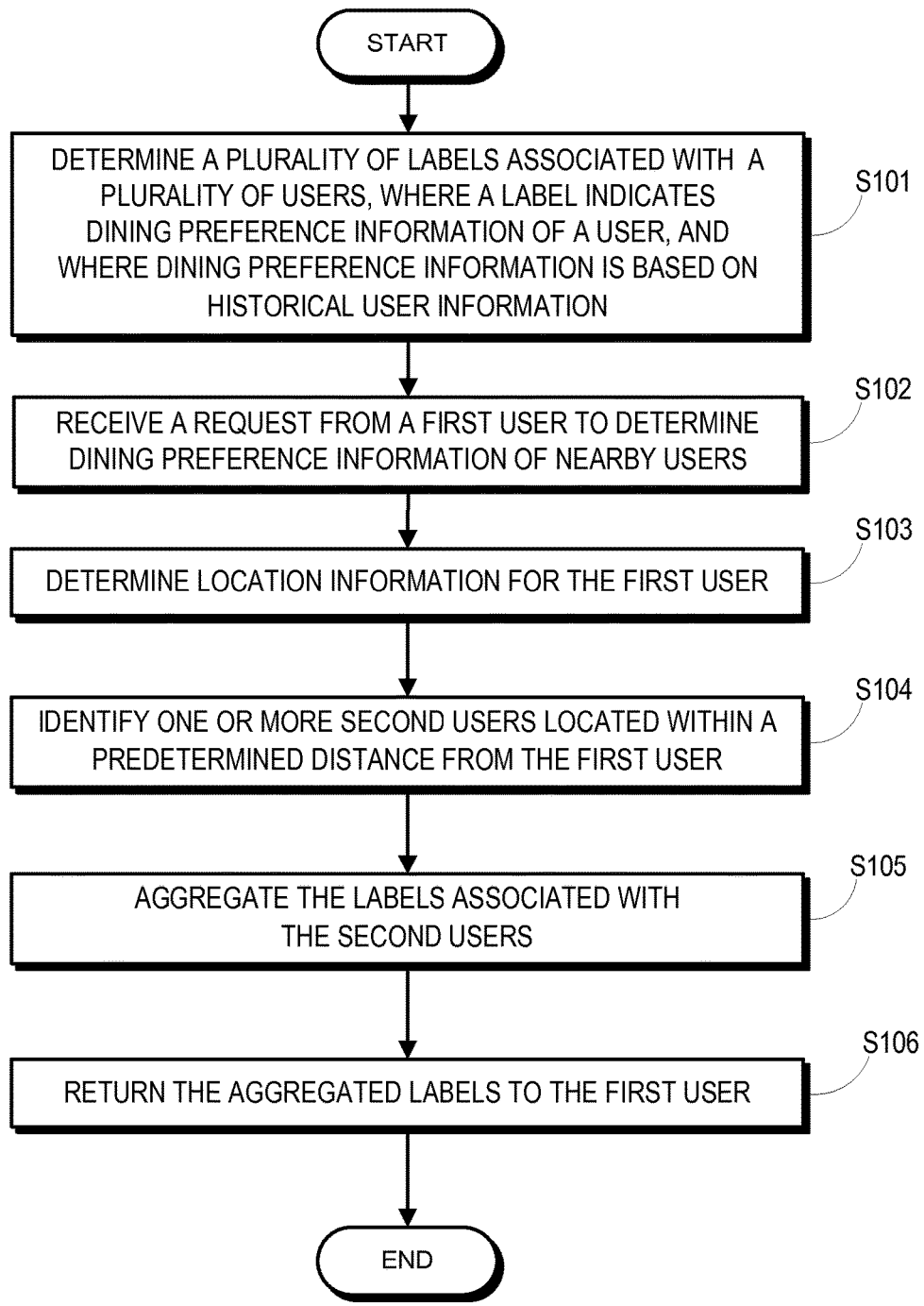
FIG. 1B presents a flowchart illustrating an operation performed by an application server, in accordance with an embodiment of the present application.

FIG. 1B presents a flowchart illustrating an operation performed by an application server, in accordance with an embodiment of the present application. During operation, the application server determines a plurality of labels associated with a plurality of users, where a label indicates dining preference information of a user, and where the dining preference information is based on historical information for the user (operation S101). In some embodiments, the application server continuously monitors the labels associated with the users. The labels associated with the users can be determined based on operations previously performed by the users (e.g., ordering, browsing, searching, and the like). The labels are used to provide surrounding users with a reference for food items from various dining venues, as described herein.

The application server can subsequently receive a request from a first user to determine the dining preference information of nearby users (operation S102). In some embodiments, the first user can send the request via a control mechanism provided for the user in a user interface on the user's device (e.g., a button, a link, and the like). The server can determine location information for the first user (operation S103). The location information can include geographical information or coordinates for the current location of the first user. The user device can include a global positioning system (GPS). Thus, for the current first user, the user device can provide the GPS coordinates to the application server to request dining preference information of nearby users.

For other users, upon user login, the user device can upload the GPS information to the server periodically at certain intervals. In this way, the server can determine the geographical location information of the online users. Or, for currently offline users, the server can use the location information determined during the most recent login as the location information of the user.

The application server subsequently identifies one or more second users that have a location that is less than a predetermined distance from the location of the first user (operation S104). The server identifies these second users by calculating the distance between the current first user and other users. If the distance between the current first user and another user is less than a predetermined distance (e.g., within a kilometer), the other user is identified as a second user.

The application server aggregates the labels associated with the one or more second users (operation S105), so that the aggregated labels can be displayed in a user interface for the first user. The server extracts the labels associated with the second users and aggregates the labels for display. The server can determine the number of times that a label is involved in a user operation, and display a set of labels where a label is involved in a user operation more than a certain number of times. Examples of aggregating labels for display are described below in relation to FIGS. 1D-1F.

Subsequently, the system returns the aggregated labels to the first user, where the aggregated labels are displayed in a user interface for the first user (operation S106). This allows the first user to obtain the dining preference information of nearby users, thus providing the first user with effective and efficient guidance to order, browse, and select food items from nearby dining venues.

Figure 1C:
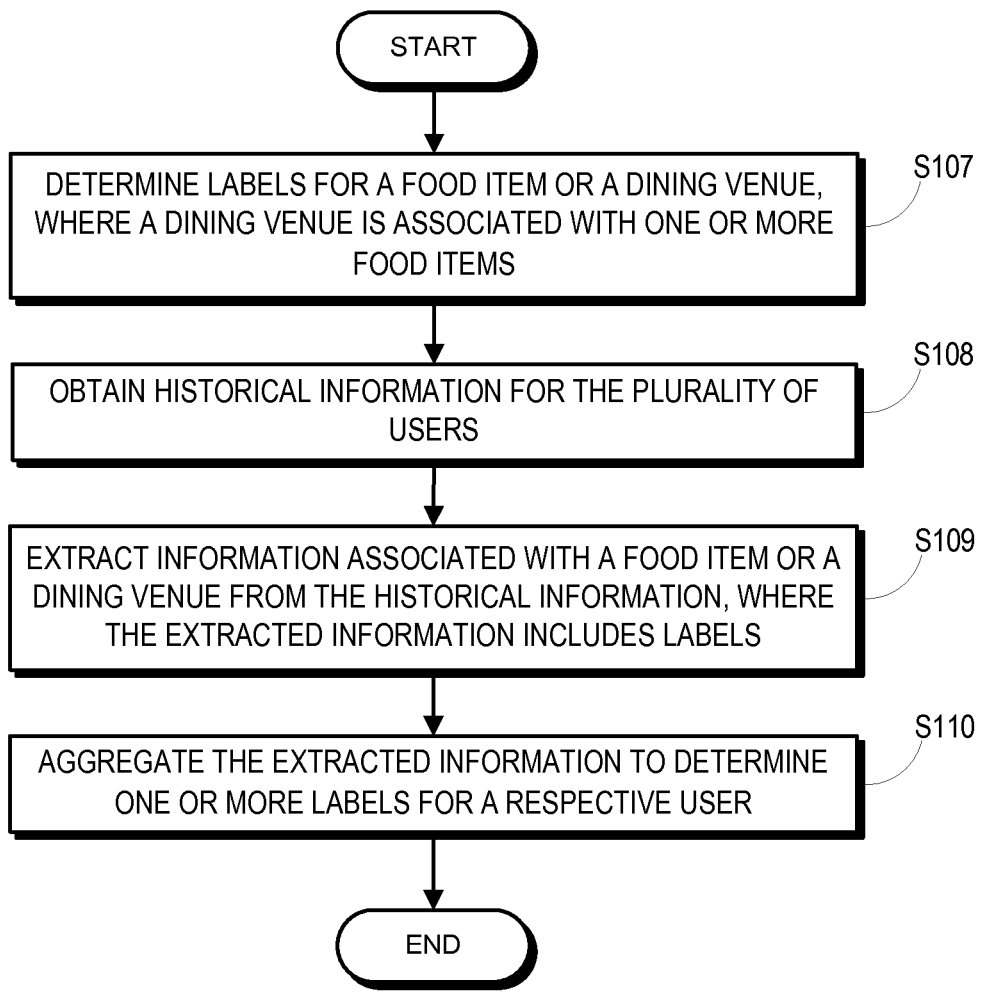
FIG. 1C presents a flowchart illustrating an operation performed by an application server, in accordance with an embodiment of the present application.

FIG. 1C presents a flowchart illustrating an operation performed by an application server, in accordance with an embodiment of the present application. FIG. 1C depicts the operations involved in operation S101 of FIG. 1B (e.g., determining a plurality of labels associated with a plurality of users). During operation, the application server determines labels for a food item or a dining venue, where a dining venue is associated with one or more food items (operation S107). Next, the server obtains historical information for the plurality of users (operation S108). The server then extracts information associated with a food item or a dining venue from the historical information, where the extracted information includes labels (operation S109). Subsequently, the server aggregates the extracted information to determine labels for a respective user (operation S110). The details of operations S107-S110 are provided below. In the dining application, multiple dining venues can be provided to a user for selection and browsing. A dining venue can be associated with multiple food items. A food item is a generalized concept and may include fried dishes, cold dishes, staple foods, snacks, beverages, and the like. A food item and a dining venue can be generally described through such information as pictures, text, and the like. While using the dining application, a user can perform operations related to the food items and dining venues, including searching, browsing, and ordering, which generates a certain association between the user, on the one hand, and the food items and the dining venues, on the other hand. To determine the dining preference information of the users, the application server can determine labels for the food items and the dining venues and subsequently associate or mark the users with the determined labels based on the operations performed by the users (e.g., the historical information of the users gathered in advance by the system).

To determine labels for the food items and the dining venues, the application server first determines labels for the food items. Subsequently, the server can determine labels for the dining venues based on the food items sold in the dining venues and the respective labels for those food items. Labels for food items can be determined in several ways. Labels can be predetermined and subsequently compared with the names of the food items. If a predetermined label matches the name of a food item, then the food item can be labeled corresponding to the predetermined label. In some embodiments, a predetermined label can be divided into multiple categories.

For example, in a category, a representative name of a food item may be directly used as the tag name. Some food items are very representative, such that the names of the food items may represent the dining preference of the users. One such example is the food item known as "braised pork in brown sauce." For such a food item, the name of the food item can be directly used as the corresponding label. In some embodiments, the representative names of food items may be predetermined, thus creating a predetermined list of names of food items. If a name belongs to the predetermined list of names, the application server can set the label for the food item to the name belonging to the predetermined list of names.

In another example, the category to which a food item belongs may be used as the label. That is, some categories are also relatively representative and may represent the dining preference of the users, such that the category can be directly used as the corresponding label. In some embodiments, the representative categories of food items may be predetermined, thus creating a predetermined list of categories of food items. If a category belongs to the predetermined list of categories, the server can set the label for the food item to the category belonging to the predetermined list of categories. For example, the food item with the name "fried chop rice cake" belongs to the "snack" category, and the "snack" category may represent the catering preference of the users, thus a "snack" label may be set for this food item.

In addition, the label may also be set based on a predetermined keyword. When determining labels for the food items, the application server can associate the food items with corresponding labels by searching the key words in the name of a food item. For example, the food items containing predetermined keywords such as "soup," "porridge," and the like may be marked with "soup-porridge" labels.

Furthermore, some food items may not belong to an exact category and may contain no obvious category or other information in their names (e.g., "Buddha Jumps Over the Wall"). For these types of food items, corresponding labels (e.g., "meat," "vegetarian," "seafood," or "soup") can be set in advance by the application server. In addition, the system can set a condition corresponding to a predetermined mapped label, which can be associated with information for a food item. The information for a food item can include a list of ingredients or a method of preparation. For example, a condition corresponding to a predetermined mapped label of "meat" can be information that includes "chicken," "pork," and the like in the list of ingredients. A condition corresponding to a predetermined mapped label of "vegetarian" can be information that includes "bean curd," "vegetarian chicken," and the like in the list of ingredients. While determining the labels for the food items, the application server can extract information (e.g., a description) for a food item from a database (e.g., ingredients, method of preparation, and the like). If a description for the food item matches a condition that corresponds to a predetermined mapped label, the system can set the label for the food item to the predetermined mapped label. For example, the ingredients of the food item named "Buddha Jumps Over the Wall" can be a soup that includes various ingredients and can meet the mapping condition corresponding to the label "soup," so the food item "Buddha Jumps Over the Wall" can be marked with the "soup" label.

In summary, food items can be labeled in multiple ways, as described above. Because a dining venue includes or is associated with multiple food items, the labels for the food items of a particular dining venue can be aggregated to obtain the labels for the dining venue. For example, if a dining venue includes 20 food items, and the labels for the 20 food items include ten food items with a "meat" label, five food items with a "soup-porridge" label, and five food items with a "snack" label, the dining venue can be marked with the following three labels: "meat," "soup-porridge," and "snack."

After the application server determines labels for food items and dining venues (operation S107), the server obtains historical information for the users (operation S108). The historical information can include information related to an operation by the user. Examples of such user operations include, but are not limited to, a transaction, a browsing function, a search function, and a picture-sharing function.

In a user operation involving a transaction, the user selects a food item in a dining venue on which to perform operations such as ordering, browsing, and the like. The server can store information related to this operation (e.g., the transaction). The information of the food item and the dining venue involved in the transaction can be extracted from the stored information, and can be further used to aggregate labels for the user.

In a user operation involving a browsing function, the user browses a dining venue or a food item in a dining venue. The server can store information related to this operation (e.g., the browsing function). The information of the food item and the dining venue involved in the browsing function can be extracted from the stored information, and can be further used to aggregate labels for the user.

In a user operation involving a search function, the user can input a search keyword in a search entry provided by the dining application, and the dining application can return a list of search results. The user can select a dining venue or a food item from the search result list to perform a subsequent operation (e.g., a transaction such as ordering, browsing, and the like). The server can store information (e.g., the keyword input and the selected search result) related to this operation (e.g., the search function). The information of the food item and the dining venue involved in the search function can be extracted from the stored information, and can be further used to aggregate labels for the user.

In addition, a user can take a picture of a food item while dining at a dining venue. The dining application can allow the user to submit the picture for sharing with other users. Thus, in a user operation involving a picture-sharing function, the user can share a picture of a dining venue or a food item in a dining venue. The server can store information related to this operation (e.g., the picture-sharing function). The information of the food item and the dining venue involved in the picture-sharing function can be extracted from the stored information, and can be further used to aggregate labels for the user.

In summary, a user generates historical information by performing a variety of user operations via the dining application. These user operations are generally associated with specific dining venues, food items, and the like. The application server can extract information relating to these dining venues and food items (operation S109).

Furthermore, the application server can aggregate the extracted information to determine a set of labels for the user (operation S110). The server can determine a set of labels that represents the dining preference of the user. In some embodiments, the system determines the set of labels by calculating a score for each label. The system assigns a predetermined weight for each type of user operation and counts the number of times that a label is involved in each type of user operation. For example, for a given label, assume the following: n1 is the number of times that the label is involved in a transaction operation by the user; w1 is the weight corresponding to the transaction operation; n2 is the number of times that the label is involved in a browsing function operation by the user; w2 is the weight corresponding to the browsing function operation; n3 is the number of times that the label is involved in a search function operation by the user; w3 is the weight corresponding to the search function operation; n4 is the number of times that the label is involved in a picture-sharing function operation by the user; and w4 is the weight corresponding to the picture-sharing function operation. The score for the label is calculated by the following formula:

$$n1*w1+n2*w2+n3*w3+n4*w4 \qquad \text{(Equation 1)}$$

In this manner, in aggregating the extracted information from the historical information, the application server determines a set of labels for a user by calculating a score for each label. A label that satisfies a certain condition (e.g., has a calculated score greater than a predetermined threshold) can be included in the determined set of labels for the user.

Exemplary Database Structures

FIG. 1D illustrates an exemplary table 150 depicting how labels for users can be stored in a database structure, in accordance with an embodiment of the present application. Table 150 can include a user identification field 180 and a plurality of labels 151-156 (e.g., tags 1-6). Each user can have a different number of labels (e.g., User A has three labels, while User B has two labels). For example, based on a table in a format similar to table 150, the application server can identify ten second users surrounding a certain first user and further determine that five users have the "Mizong crab" label, three users have the "Sirloin steak" label, two users have the "Bean curd with odor" and "Korean cuisine" labels, and the other tags occur only once. Thus, these above-mentioned tags can be used as the tags to be displayed.

FIG. 1E illustrates an exemplary table 160 depicting how labels for users can be stored in a database structure, including a score for each label, in accordance with an embodiment of the present application. Table 160 can include a user identification field 180, a plurality of labels 151-153 (e.g., tags 1-3) and a corresponding score for each label (e.g., scores 161-163 for tags 1-3, respectively). For example, based on a table in a format similar to table 160, the calculated score for a label can be considered. If a given label exists in the database for multiple second users, the scores for the label of these second users can be added to obtain a cumulative score for the label. The application server can then compare the cumulative scores. The labels with the highest cumulative scores (e.g., greater than a predetermined threshold) are determined as the final labels to be displayed. For example, assume that Users A and B are identified as second users (e.g., located within a certain predetermined distance from the first user). Users A and B each have the "Mizong crab" label, where the score for the label of User A is "S1," and the score for the label of user B is "S2." The two scores can be added to obtain the cumulative score for the label. If a label exists for only one second user, the score for the label of the second user can be directly used as the cumulative score of the label. Thus, even if each label occurs only once, the labels to be displayed can be selected from numerous labels according to the calculated score or the cumulative score.

In addition, a dining preference of a user related to a food item or a dining venue can differ based on the time of day or the time range during which the user performs a particular operation. Thus, an incidence relationship may be established between the label and the specific time range and stored in the database. FIG. 1F illustrates an exemplary table 170 depicting how labels for users can be stored in a database structure, including a score and a time range for each label, in accordance with an embodiment of the present application. Table 170 can include a user identification field 180, a plurality of labels 151-152 (e.g., tags 1-2) and a corresponding score for each label (e.g., score fields 161-162 for tags 1-2, respectively) and a corresponding time range for each label (e.g., time range fields 171-172 for tags 1-2, respectively). The value for a time range field can have a predetermined start and end time. For example, a 24-hour day can be divided into six time slots according to the usual dietary habits of users, where the first time range is from 7:00 to 9:00, the second time range is from 10:00 to 11:00, the third time range is from 11:30 to 13:00, the fourth time range is from 15:00 to 16:00, the fifth time range is from 17:30 to 19:30, and the sixth time range is from 22:00 to 23:00. In this way, when the labels are aggregated, the time ranges for the occurrences of the user operations corresponding to the labels can also be determined. For a given label, the associated time range can be determined. For example, ten operations of a user involve the label "Mizong crab," and of the ten operations, eight occur in the time range from 17:30 to 19:30. The system can determine that the time range associated with the label "Mizong crab" for the user is from 17:30 to 19:30. Thus, the system can use a target time (e.g., the current time) to provide dining preference information of other users, increasing the effectiveness of the guidance provided by the system.

For example, based on a table in a format similar to table 170, the application server can determine a target time range of a request of a current first user. Only the labels associated with the target time range and corresponding to the identified second users are aggregated to determine the labels to be displayed. For instance, if the time range in which the request of the first user is received (e.g., the target time range) is from 17:30 to 19:30, only the labels associated with the target time range for the second users are aggregated to determine the labels to be displayed. In other words, when a user requests dining preference information of nearby users (e.g., users located within a certain distance), the labels aggregated by the server based on the target time range (e.g., table 170) may be different from the labels aggregated by the server based only on the number of times a label appears for a user (e.g., table 150) or the calculated score or cumulative score for the labels of the second users (e.g., table 160).

Exemplary User Interface

Figure 2:
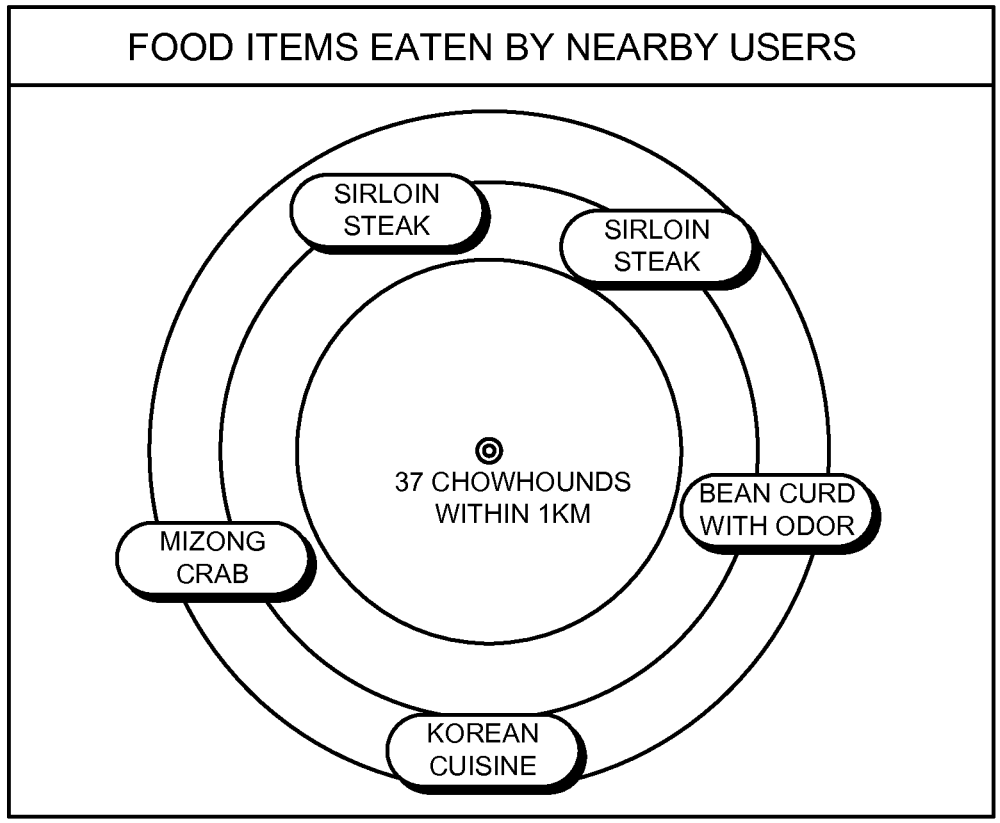
FIG. 2 illustrates an exemplary user interface, in accordance with an embodiment of the present application.

The computing device of the first user can display the returned labels in a predefined display area in the user interface. FIG. 2 illustrates an exemplary user interface, in accordance with an embodiment of the present application. In FIG. 2, a number of concentric circles are displayed to indicate distance from the user's location, which is represented as the center of these circles. The labels are presented as actionable icons (such as clickable buttons), and placed around the concentric circles based on their corresponding locations. Exemplary labels can include "Mizong crab," "Sirloin steak," "Bean curd with odor," "Korean cuisine," or the like. In addition, the application server can count the number of identified second users located within the predetermined distance and present this number to the first user. For example, in FIG. 2, "37 chowhounds within 1 km" is displayed at the center of the circles.

In some embodiments, in order to enable the current first user to order food items based on the dining preference information of the surrounding second users, the labels can be presented as actionable icons, such as a button or a link. When a label is acted upon (e.g., selected), the user device transmits the label's corresponding information, such as a label identifier, the food item's information, and/or the venue information, to the server. In addition, the user device can transmit the user's current location to the server. This allows the application server to determine a geographic area in which the user is currently located, a target dining venue, and information regarding the target dining venue. The relevant information can include the specific location of the dining venue, the distance between the current user and the target dining venue, and directions for reaching the target dining venue. The relevant information can also include food items offered by the target dining venue, including the price of the food item and a picture of the food item or target dining venue.

In addition, an actionable icon provided to the user (e.g., in the form of a button) can be used for initiating an order. For example, upon reviewing the location of the store and the prices of the food items, if the user wishes to order a food item, the user may click a button corresponding to the food item to send the order, and the application server can generate an order (e.g., by contacting a transaction server or datacenter of the e-commerce merchant corresponding to the dining venue). If the user wishes to browse or look up other food items of a dining venue, the user can directly initiate the request through an icon for entering the store. The server can subsequently return information to the user via the user interface to display information related to the store, including food items, prices, and pictures.

Figure 3:
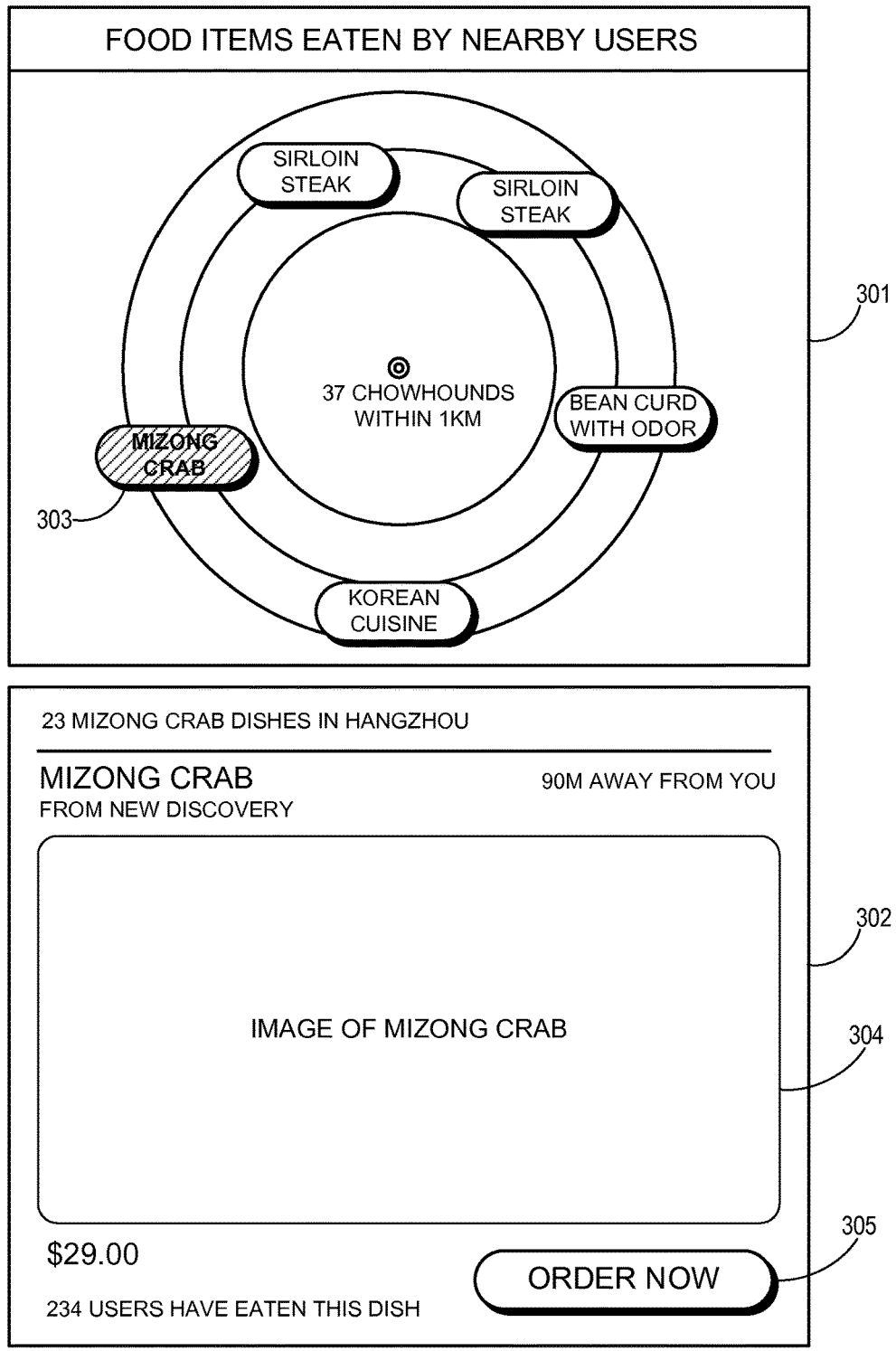
FIG. 3 illustrates an exemplary user interface, in accordance with an embodiment of the present application.

FIG. 3 illustrates an exemplary user interface, in accordance with an embodiment of the present application. After the information as shown in FIG. 2 is displayed to the first user, it is assumed that the first user is interested in the dish "Mizong crab." The first user can click a corresponding label 303 in a first display area 301, which sends the corresponding label to the application server. The server can determine the target dining venue with the food item corresponding to the label, where the dining venue is within the geographic area where the first user is currently located. The server can return related information to the first user, and the information can be displayed on the computing device of the first user. For example, "23 Mizong crab dishes in Hangzhou" is displayed in a second display area 302, indicating that the first user is currently located in Hangzhou, and 23 dining venues in Hangzhou offer the food item "Mizong crab." The price and image of the food item from a certain dining venue is also displayed (e.g., "$29.00" and an image 304). In addition, an actionable icon is provided to the user in the form of an "Order Now" button 305 so that the first user can order the food item by clicking button 305. In this way, the first user can order the desired food item without performing multiple ordering steps.

As shown in FIG. 3, after the icon corresponding to a label is acted upon, the computing device can display the target dining venue returned by the application server and the information of the corresponding food item in second display area 302 of the user interface. Second display area 302 can be displayed in the same user interface as first display area 301 (which displays the labels). Additional content can be displayed in second display area 302. Some of the content can be displayed in the visible area of the window, while some of the content might not be displayed in the visible area of the window. In this case, the user can operate the user interface to view the content not displayed in the visible area (e.g., by sliding across a touch screen) so that first display area 301 can be moved out of the visible range of the window. After viewing the content in second display area 302, the user may wish to look up other labels. To do so, the user can slide the user interface again to move first display area 301 to the visible area of the window, and subsequently click on another label to view information for the other label.

Figure 4:
FIG. 4 illustrates an exemplary user interface, in accordance with an embodiment of the present application.

In some embodiments, when the user interface is operated upon so that first display area 301 is moved out of the visible range of the window, the image area occupied by the displayed labels can be reduced, and displayed and arranged at predetermined positions within the visible range of the window. For example, the labels can be displayed at the top of the window in a horizontal row. In this way, the labels remain visible, allowing the user to switch labels at any time. The currently selected label can also be prominently displayed. FIG. 4 illustrates an exemplary user interface, in accordance with an embodiment of the present application. When the first user drags the user interface downward, the matched labels can be displayed at the top of the window in a horizontal row 401, and the label corresponding to the currently selected "Mizong crab" label 303 is prominently displayed.

Role of Client Computing Device

Figure 5:
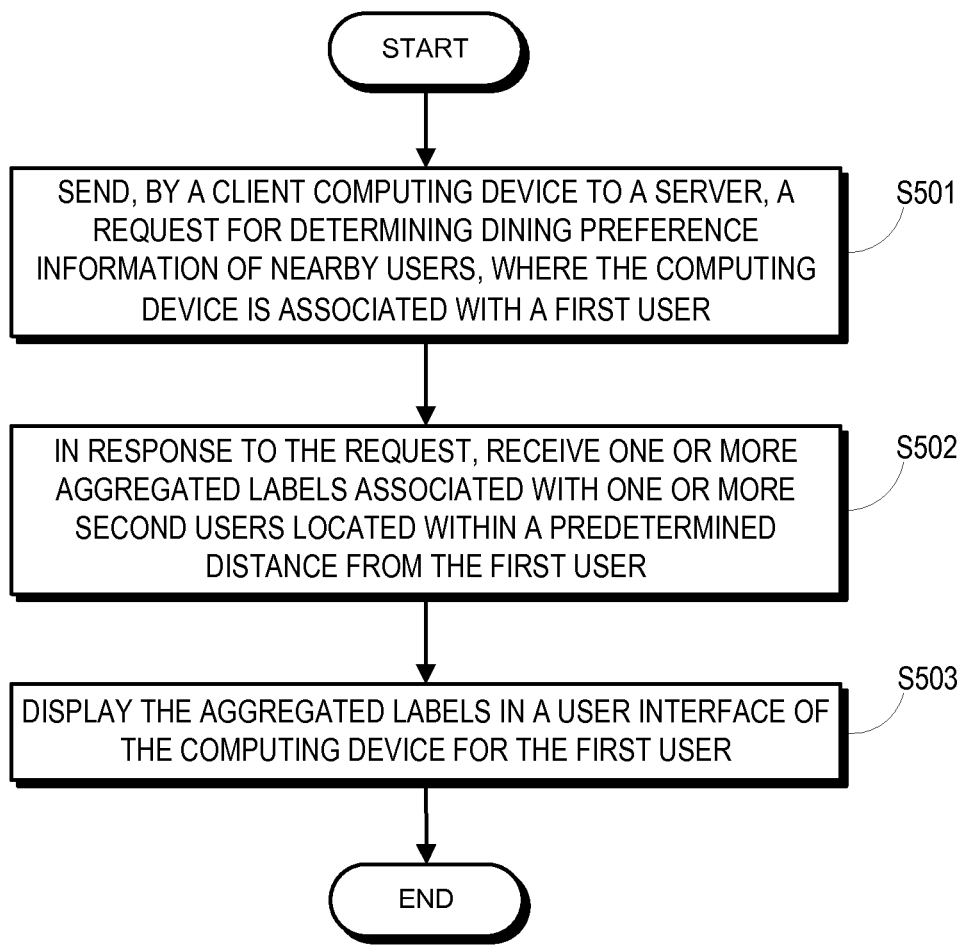
FIG. 5 presents a flowchart illustrating an operation performed by a client computing device, in accordance with an embodiment of the present application.

FIG. 5 presents a flowchart illustrating an operation performed by a client computing device, in accordance with an embodiment of the present application. During operation, a client computing device sends a request for determining dining preference information of nearby users (operation S501). The computing device is associated with a first user, and the request is sent to an application server. The request enables the application server to determine a location for the first user, identify one or more second users which have a location that is less than a predetermined distance from the location of the first user, aggregate the labels associated with the identified second users, and return the aggregated labels to the client computing device for display.

In response to the request, the client computing device receives one or more aggregated labels associated with one or more second users located within a predetermined distance from the first user (S502). Subsequently, the computing device displays the aggregated labels in a user interface of the client computing device for the first user (operation S503). The returned labels can be displayed in the user interface as actionable icons, such as a button or a link.

When an icon is acted upon (e.g., selected), the corresponding label is sent to the server. This allows the application server to determine a geographic area in which the user is currently located, a target dining venue within the determined geographic area, and relevant information regarding the target dining venue.

Exemplary Computer and Communication Systems

Figure 6:
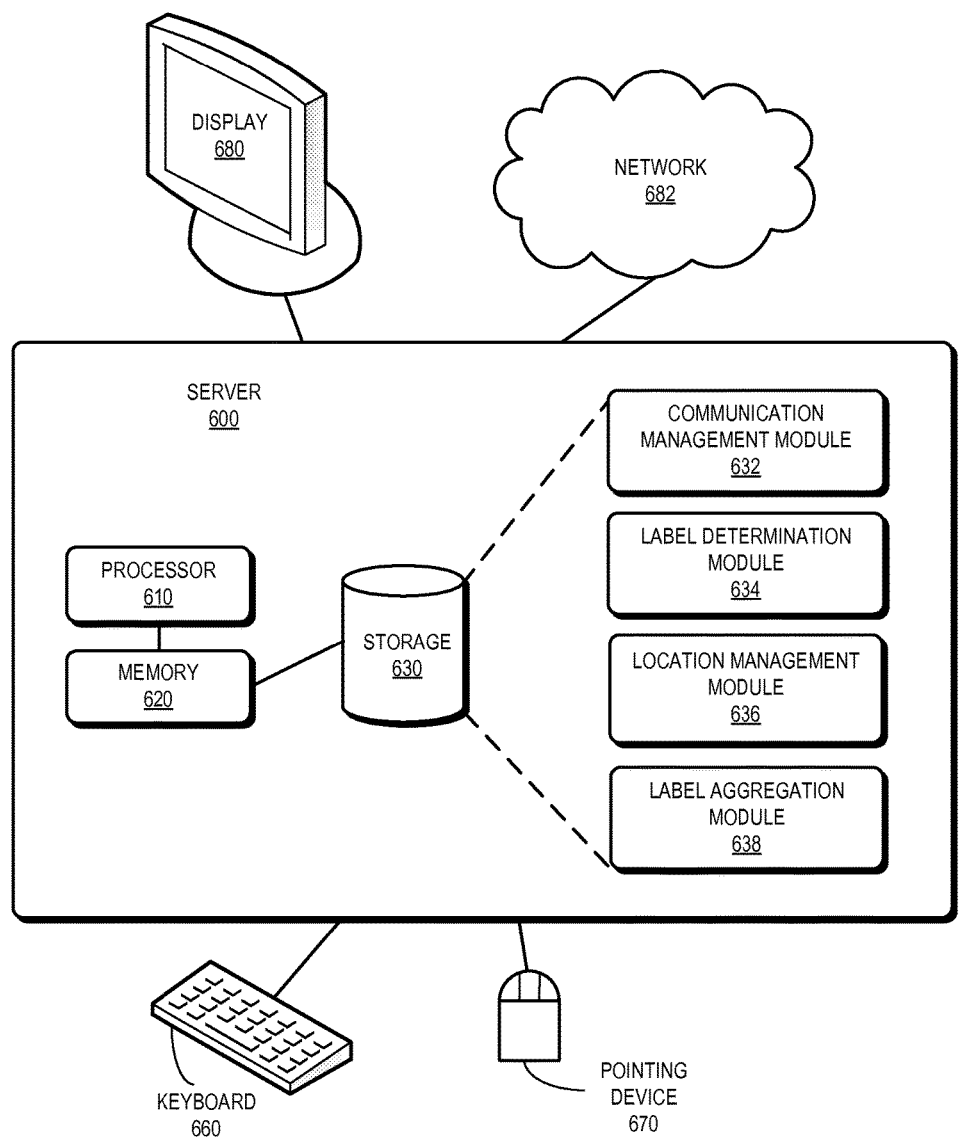
FIG. 6 illustrates an exemplary server that facilitates efficient use of a dining application, in accordance with an embodiment of the present application.

FIG. 6 illustrates an exemplary server 600 that facilitates efficient use of a dining application, in accordance with an embodiment of the present invention. In this example, server 600 includes a processor 610, a memory 620, and a storage device 630. Storage 630 typically stores instructions that can be loaded into memory 620 and executed by processor 610 to perform the methods described above. In one embodiment, the instructions in storage 630 can implement a communication management module 632, a label determination module 634, a location management module 636, and a label aggregation module 638, all of which can communicate with each other through various means.

In some embodiments, modules 632, 634, 636, and 638 can be partially or entirely implemented in hardware and can be part of processor 610. Further, in some embodiments, the system may not include a separate processor and memory. Instead, in addition to performing their specific tasks, modules 632, 634, 636, and 638, either separately or in concert, may be part of special-purpose computation engines.

Storage 630 stores programs to be executed by processor 610. Specifically, storage 630 stores a program that implements a system (application) for making dining recommendations in a dining application. During operation, the application program can be loaded from storage 630 into memory 620 and executed by processor 610. As a result, server 600 can perform the functions described above. Server 600 can be further coupled to an optional display 680, a keyboard 660, and a pointing device 670, and can be coupled via one or more network interfaces to a network 682.

During operation, label determination module 634 determines a plurality of labels associated with a plurality of users, where a label indicates dining preference information of a user, and where the dining preference information is based on historical information for the user. Communication management module 632 receives a request from a first user to determine dining preference information of nearby users. Location management module 636 determines a location for the first user, and identifies one or more second users that have a location that is less than a predetermined distance from the location of the first user. Label aggregation module 638 aggregates the labels associated with the second users. Communication management module 632 returns the aggregated labels to the first user's device, where the aggregated labels will be displayed to the first user.

Label determination module 634 further determines labels for a food item or a dining venue, wherein a dining venue is associated with one or more food items. In addition, label determination module 634 obtains historical information for the plurality of users and extracts information associated with a food item or a dining venue from the historical information. Label determination module 634 also aggregates the extracted information to determine a set of labels for a respective user.

In addition, label determination module 634 can perform the following operations: in response to determining that a name for the food item is associated with a predetermined list of names, set the label for the food item to the name; in response to determining that a category for the food item is associated with a predetermined list of categories, set the label for the food item to the category; in response to determining that a name for the food item includes a word that corresponds to a predetermined keyword label, set the label for the food item to the predetermined keyword label; and in response to determining that a description for the food item matches a condition that corresponds to a predetermined mapped label, set the label for the food item to the predetermined mapped label. Label determination module 634 can further indicate a time range for a respective label based on a number of times the label is associated with an operation included in the historical information.

Label aggregation module 638 can determine a number of occurrences in which a label is associated with an operation included in the historical information, calculate a score for a respective label based on the determined number of occurrences and a predetermined weight for the corresponding operation, and determine a set of labels for the respective user based on the calculated score. Label aggregation module 638 can also determine a target time range based on a current time and aggregate labels that are associated with the target time range and the one or more second users.

Communication management module 632 receives, from the first user, a request for information associated with a label selected by the first user, which request allows server 600 to determine a dining venue associated with food items corresponding to the selected label, where the dining venue is located within a predetermined distance from the location of the first user. Communication management module 632 returns information associated with the determined dining venue and the associated food items.

Figure 7:
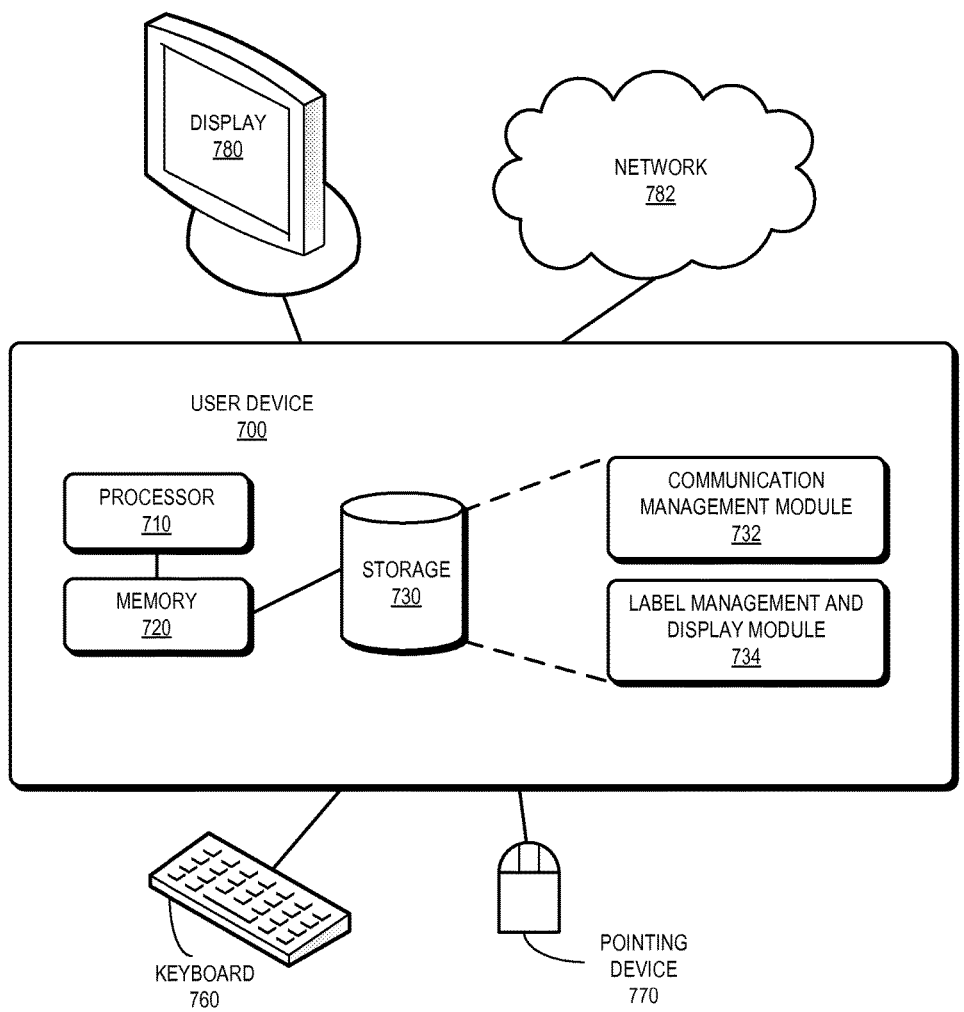
FIG. 7 illustrates an exemplary user device that facilitates efficient use of a dining application, in accordance with an embodiment of the present application.

FIG. 7 illustrates an exemplary user device 700 that facilitates efficient use of a dining application, in accordance with an embodiment of the present invention. User device 700 includes a processor 710, a memory 720, and a storage device 730. Storage 730 typically stores instructions that can be loaded into memory 720 and executed by processor 710 to perform the methods described above. In one embodiment, the instructions in storage 730 can implement a communication management module 732 and a label management and display module 734, both of which can communicate with each other through various means.

In some embodiments, modules 732 and 734 can be partially or entirely implemented in hardware and can be part of processor 710. Further, in some embodiments, the system may not include a separate processor and memory. Instead, in addition to performing their specific tasks, modules 732 and 734, either separately or in concert, may be part of special-purpose computation engines.

Storage 730 stores programs to be executed by processor 710. Specifically, storage 730 stores a program that implements a system (application) for making dining recommendations in a dining application. During operation, the application program can be loaded from storage 730 into memory 720 and executed by processor 710. As a result, user device 700 can perform the functions described above. User device 700 can be further coupled to an optional display 780, a keyboard 760, and a pointing device 770, and can be coupled via one or more network interfaces to a network 782. Note that user device 700 can be a personal computer, a tablet, a smartphone, or any type of mobile device. Furthermore, the functions of display 780, keyboard 760, and pointing device 770 can be providing by a touch screen.

During operation, communication management module 732 sends to a server a request for determining dining preference information of nearby users for a first user. The server determines a location for the first user, identifies one or more second users located within a predetermined distance from the first user, aggregates the labels associated with the second users, and returns the aggregated labels to the user device 700. Label management and display module 734 displays the returned aggregated labels in a user interface on display 780.

Upon the first user selecting a label, communication management module 732 sends a command (e.g., ordering a food item or browsing information related to a food item) to the server based on the selected label. The server, in turn, determines a dining venue associated with food items corresponding to the selected label, where the dining venue is located within a predetermined distance from the first user. The server then returns information associated with the determined dining venue and food items. Label management and display module 734 subsequently displays the returned information via the user interface.

In summary, the labels capable of representing the dining preferences of the users can be generated in advance based on the historical information of the surrounding users. Thus, when a first user wishes to know the dining preference information of other nearby users, the application server identifies second users who are geographically close to the first user's current location, and aggregates the labels for the second users to determine which labels to return to the first user. The computing device of the first user displays the returned labels to the first user, as described above, allowing the first user to learn about the dining preference information of other surrounding users. The system provides specific surrounding user information to the first user, which provides an efficient and effective reference to the first user for ordering food items. In addition, the system allows the first user to find the desired dishes without searching through a large number of food items in multiple dining venues, one by one, thus increasing the efficiency of the dining application.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for providing dining recommendations, the method comprising:
   sending, to a server by a first client computing device associated with a first user, a request for determining dining preference information of nearby users;
   obtaining a current location of the first user based on a GPS sensor on the first client computing device;
   in response to the request, receiving, by the first client computing device, one or more aggregated labels associated with one or more second users located within a first predetermined distance from a location of the first user,
   wherein a location of a respective second user is obtained based on a GPS sensor on a second client computing device associated with the respective second user;
   displaying the aggregated labels in a first display area of a user interface display of the first client computing device, wherein the aggregated labels indicate dining venues and food items located within a second predetermined distance from the location of the first user; and
   in response to the user moving the first display area out of a visible range of the user interface display:
      reducing an image area occupied by the displayed labels in the visible range of the user interface display;
      displaying a target dining venue and associated food items in a second display area of the user interface display; and
      displaying the aggregated labels in predetermined positions in the reduced image area in the visible range of the user interface display, thereby allowing the aggregated labels to remain visible and allowing the user to switch labels at any time.

2. The method of claim 1, further comprising:
   selecting, by the first user, one of the displayed labels;
   sending, by the client computing device to the server, a command based on the selected label;
   in response to the command, receiving, by the client computing device, information corresponding to the selected label and associated with a target dining venue located within a second predetermined distance from the location of the first user; and
   displaying, by the client computing device in the user interface, the received information, which indicates the target dining venue and associated food items.

3. The method of claim 2, wherein the command indicates:
   an order by the first user for a food item from a dining venue selected by the first user; or
   a browsing operation for information relating to a food item from a dining venue selected by the first user.

4. The method of claim 2, wherein the displayed labels are displayed in a first display area of the user interface;
   wherein the received information indicating the target dining venue and the associated food items is displayed in the second display area of the user interface.

5. The method of claim 2, wherein sending the command to the server based on the selected label causes the server to:
   receive the command based on the selected label;
   determine a dining venue associated with food items which are associated with the selected label, wherein the dining venue is located within the second predetermined distance from the location of the first user; and
   return information associated with the determined dining venue and the associated food items to the first user.

6. The method of claim 1, wherein sending the request to the server causes the server to:
   determine the location of the first user;
   identify the one or more second users located within the first predetermined distance from the location of the first user;
   aggregate one or more labels associated with the second users; and
   return the one or more aggregated labels to the first user.

7. The method of claim 1,
   wherein the server determines a plurality of labels associated with a plurality of users,
   wherein the plurality of labels includes the aggregated labels,
   wherein the plurality of users includes the first user, the nearby users, and the second users,
   wherein a label indicates dining preference information of a user, and
   wherein the dining preference information of the user is based on historical information for the user.

8. The method of claim 7, wherein the server determines the plurality of labels by:
   determining labels for a food item or a dining venue;
   obtaining historical information for the plurality of users;
   extracting information associated with a food item or a dining venue from the historical information; and
   aggregating the extracted information to determine one or more labels for a respective user.

9. The method of claim 8, wherein determining labels for a food item or a dining venue comprises one or more of:
   in response to determining that a name for the food item is associated with a predetermined list of names, setting the label for the food item to the name;
   in response to determining that a category for the food item is associated with a predetermined list of categories, setting the label for the food item to the category;
   in response to determining that a name for the food item includes a word that corresponds to a predetermined keyword label, setting the label for the food item to the predetermined keyword label; and
   in response to determining that a description for the food item matches a condition that corresponds to a predetermined mapped label, setting the label for the food item to the predetermined mapped label.

10. The method of claim 8, wherein the historical information includes one or more of:
    a transaction performed by a respective user;
    a browsing function performed by the respective user;
    a search function performed by the respective user; and
    a picture-sharing function performed by the respective user.

11. The method of claim 8, wherein aggregating the extracted information comprises:
    determining a number of occurrences in which a label is associated with an operation included in the historical information;
    calculating a score for a respective label based on the determined number of occurrences and a predetermined weight for the corresponding operation; and determining the labels for the respective user based on the calculated score.

12. The method of claim 8, wherein the server further determines the plurality of labels by:
indicating a time range for a respective label based on a number of occurrences in which the label is associated with an operation included in the historical information; and
wherein aggregating the labels associated with the second users comprises:
determining a target time range based on a current time; and
aggregating labels which are associated with the target time range and the second users.

13. A computer system for providing dining recommendations, the computer system comprising:
a processor; and
a memory coupled to the processor and storing instructions, which when executed by the processor cause the processor to perform a method, the method comprising:
sending, to a server by the computer system associated with a first user, a request for determining dining preference information of nearby users, wherein the computer system is a first client computing device;
obtaining a current location of the first user based on a GPS sensor on the first client computing device;
in response to the request, receiving, by the first client computing device, one or more aggregated labels associated with one or more second users located within a first predetermined distance from a location of the first user,
wherein a location of a respective second user is obtained based on a GPS sensor on a second client computing device associated with the respective second user;
displaying the aggregated labels in a first display area of a user interface display of the first client computing device, wherein the aggregated labels indicate dining venues and food items located within a second predetermined distance from the location of the first user; and
in response to the user moving the first display area out of a visible range of the user interface display:
reducing an image area occupied by the displayed labels in the visible range of the user interface display;
displaying a target dining venue and associated food items in a second display area of the user interface display; and
displaying the aggregated labels in predetermined positions in the reduced image area in the visible range of the user interface display, thereby allowing the aggregated labels to remain visible and allowing the user to switch labels at any time.

14. The computer system of claim 13, wherein the method further comprises:
selecting, by the first user, one of the displayed labels;
sending, by the client computing device to the server, a command based on the selected label;
in response to the command, receiving, by the client computing device, information corresponding to the selected label and associated with a target dining venue located within a second predetermined distance from the location of the first user; and
displaying, by the client computing device in the user interface, the received information in the user interface, wherein the received information indicates the target dining venue and associated food items.

15. The computer system of claim 14, wherein the command indicates:
an order by the first user for a food item from a dining venue selected by the first user; or
a browsing operation for information relating to a food item from a dining venue selected by the first user.

16. The computer system of claim 14, wherein the plurality of displayed labels are displayed in a first display area of the user interface;
wherein the received information indicating the target dining venue and the associated food items is displayed in the second display area of the user interface.

17. The computer system of claim 14, wherein sending the command to the server based on the selected label causes the server to:
receive the command based on the selected label;
determine a dining venue associated with food items which are associated with the selected label, wherein the dining venue is located within the second predetermined distance from the location of the first user; and
return information associated with the determined dining venue and the associated food items to the first user.

18. The computer system of claim 13, wherein sending the request to the server causes the server to:
determine the location of the first user;
identify the one or more second users located within the first predetermined distance from the location of the first user;
aggregate one or more labels associated with the second users; and
return the one or more aggregated labels to the first user,
wherein the server determines a plurality of labels associated with a plurality of users,
wherein the plurality of labels includes the aggregated labels,
wherein the plurality of users includes the first user, the nearby users, and the second users,
wherein a label indicates dining preference information of a user, and
wherein the dining preference information of the user is based on historical information for the user.

19. The computer system of claim 18, wherein the server determines the plurality of labels by:
determining labels for a food item or a dining venue;
obtaining historical information for the plurality of users;
extracting information associated with a food item or a dining venue from the historical information; and
aggregating the extracted information to determine one or more labels for a respective user.

20. The computer system of claim 19, wherein determining labels for a food item or a dining venue comprises one or more of:
in response to determining that a name for the food item is associated with a predetermined list of names, setting the label for the food item to the name;
in response to determining that a category for the food item is associated with a predetermined list of categories, setting the label for the food item to the category;
in response to determining that a name for the food item includes a word that corresponds to a predetermined keyword label, setting the label for the food item to the predetermined keyword label; and
in response to determining that a description for the food item matches a condition that corresponds to a predetermined mapped label, setting the label for the food item to the predetermined mapped label.

21. The computer system of claim 19, wherein aggregating the extracted information comprises:
    determining a number of occurrences in which a label is associated with an operation included in the historical information;
    calculating a score for a respective label based on the determined number of occurrences and a predetermined weight for the corresponding operation; and
    determining the labels for the respective user based on the calculated score.

22. The computer system of claim 19, wherein the server further determines the plurality of labels by:
    indicating a time range for a respective label based on a number of occurrences in which the label is associated with an operation included in the historical information; and
    wherein aggregating the labels associated with the second users comprises:
        determining a target time range based on a current time; and
        aggregating labels which are associated with the target time range and the second users.

* * * * *